April 19, 1966
A. L. JOHNSON
3,246,873
BALL FOR VALVES
Filed Feb. 12, 1964
2 Sheets-Sheet 2
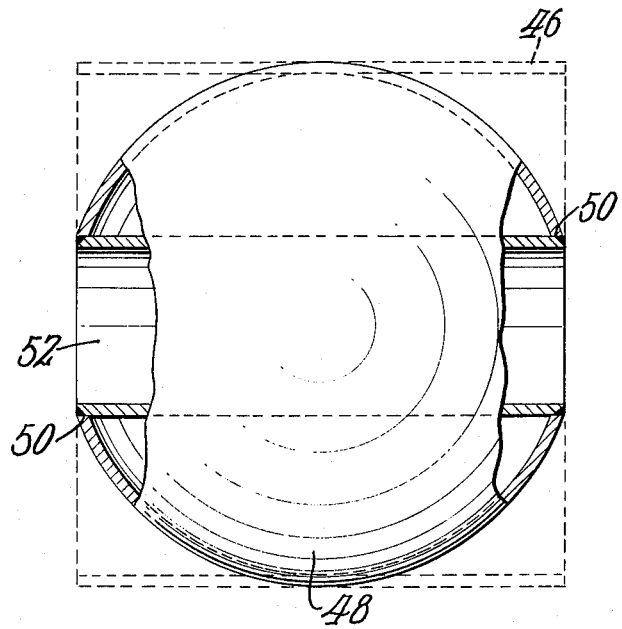
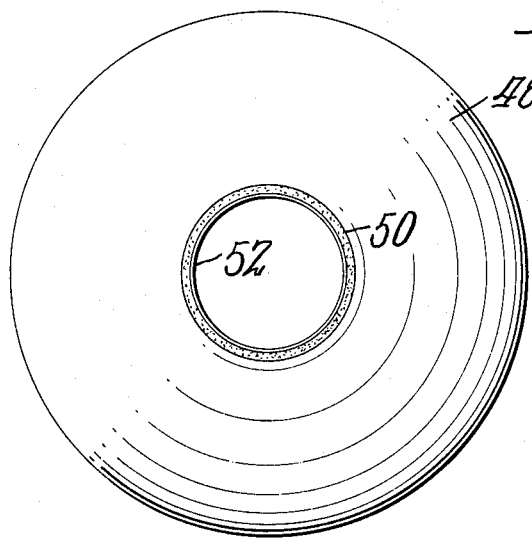

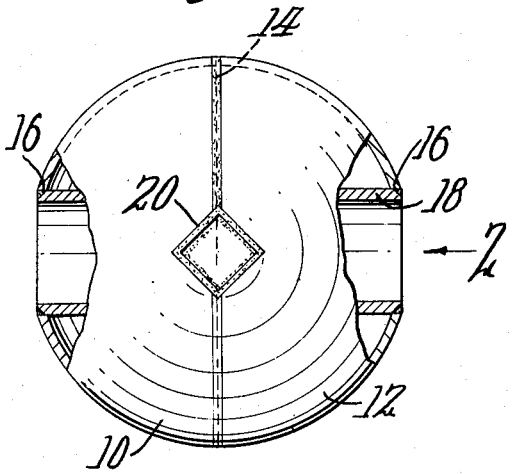
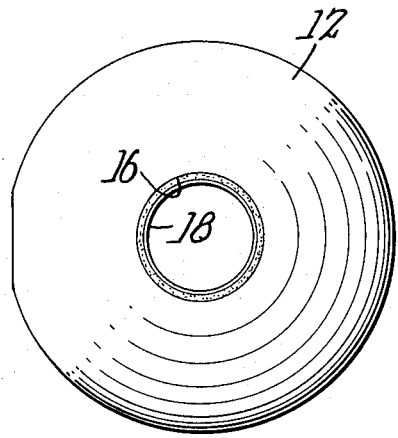
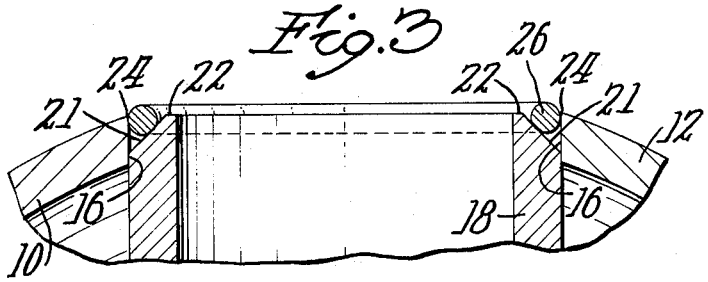
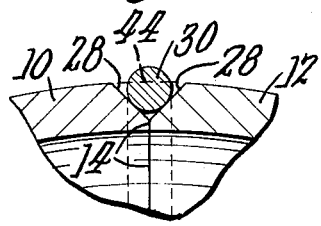
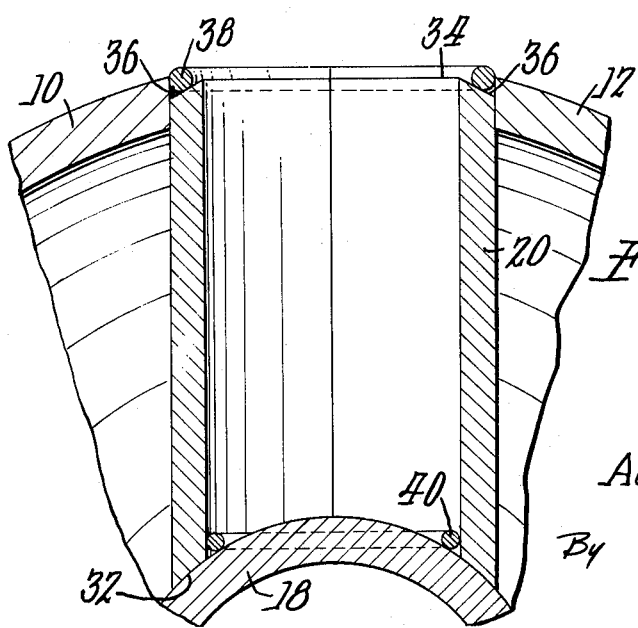

_United States Patent Office_ 3,246,873
Patented Apr. 19, 1966

3,246,873
BALL FOR VALVES
Alvin L. Johnson, 337 Park Ave., Worcester, Mass.
Filed Feb. 12, 1964, Ser. No. 344,300
7 Claims. (Cl. 251—356)

This invention relates to a new and improved ball and method of making the same, the ball being particularly adapted to use in the well known ball valve, and the principal object of the invention resides in the provision of a new and improved ball construction which is much less expensive to manufacture than balls of the prior art and which is a great deal lighter but just as strong and effective.

Further objects of the invention reside in the provision of a ball for ball valves including three main portions, one of which is a cylindrical sleeve member adapted to extend diametrically of the finished ball, and two one-half ball surface parts, each of which is in the form of a hemisphere having an opening centrally thereof, the ends of the sleeve being aligned in general with the openings in said ball-surface members and the edges of the hemispheres contacting each other and being connected to finish the ball, the parts being preferably brazed together at the ends of the sleeve and at the contacting edges of the two one-half ball-surface members.

Another object of the invention resides in the provision of a new and improved key which is provided by a non-circular hollow member in the form of a tube having one end connected radially to the sleeve member at a surface thereof and having its other end connected to the edges formed by complementary openings in the ball-surface members connecting the same and rigidifying the structure, said key being thereby connected to all three main members of the ball and forming a strong and rigid construction.

A still further object of the invention resides in the provision of a method of making the above described ball by new and improved brazing steps.

Other objects and advantages of the invention will appear hereinafter.

Reference is to be had to the accompanying drawings, in which:

FIG. 1 is a view in elevation illustrating the invention, part being broken away;

FIG. 2 is a view in elevation looking in the direction of arrow 2 in FIG. 1;

FIG. 3 is a view on an enlarged scale illustrating the method of securing the sleeve to the ball surface members;

FIG. 4 is a view on a similar scale illustrating the connection of the ball surface members;

FIG. 5 is a sectional view illustrating the method of securing the key in position; and FIGS. 6 and 7 illustrate a modification of the process of making the ball.

In carrying out the invention the same comprises a pair of similar hemispherical hollow ball surface members 10 and 12 which are joined along corresponding edges as at the equator at 14. Each of these members is provided with a central circular opening indicated at 16, and the third member comprises a cylindrical tubular sleeve 18 which is secured at its ends to the edges of the ball surface members formed by the openings 16, thus forming the complete ball, the sleeve 18 of course forming the fluid passage.

There is a key which is generally indicated at 20 in FIG. 1 comprising a non-cylindrical tubular member having an end secured to the ball surface halves 10 and 12 in the position shown in FIG. 1, and having its other end secured to the surface of the sleeve 18. All of these parts are preferably made of pressed metal or by spinning, and it will be seen that a great deal of weight is saved over the usual solid ball for ball valves and also that by the use of pressed metal parts the same are provided extremely easily and inexpensively in quantity and are easily put together completely ready for use.

Referring now to FIG. 3 there is shown a method by which the ends of the sleeve are secured to the ball surface halves. But one end of the sleeve is shown but both ends are provided with the same construction. The end edges of the sleeve 18 are exteriorly beveled off as is indicated at 21, 21 but the extreme ends 22, 22 are aligned approximately with the outer edges 24, 24 which surround the opening 16 in the ball surface members. This leaves an annular receptacle of relatively small size as clearly shown in FIG. 3, this receptacle being triangular in section. In the annular triangular space there is deposited an annular wire 26, this wire being of copper or some brazable material.

The two ball surface halves 10 and 12 are provided at their meeting line 14 with chamfered or beveled edges 28, 28 and a brazable wire 30 is provided about the equator as shown in FIG. 4, being located in the recess occasioned by the bevels 28.

Referring now to FIG. 5, there is shown the non-circular tubular member 20 and it will be seen that this has one end 32 abutted against the surface of sleeve 18, this end of the tubular member 20 conforming to the surface. The other end of tubular member 20 is indicated at 34 and this end is inset slightly as indicated at 36, 36 from the surface of the members 10 and 12. On the end 34 of tubular member 20 there is provided a wire member 38 which is similar to those at 26 and 30 and conforms to the sectional shape of the tubular member 20, 20. Also a slightly smaller size but of same shape wire member 40 is applied on the surface of sleeve 18 contacting the inner surfaces of tubular members 20 and sleeve 18.

Now with the parts in the position as described, the ball need only be heated up the required degree to cause fusion of all of the wires 26, 30, 38 and 40 permanently securing the ends of the sleeve with respect to the ball surface members 10 and 12 along the dotted lines 42, 42. The same occurs at the equator on the contacting edges 14 of the ball surface parts 10 and 12 as along the dotted line 44. Also the two ends of tubular member 20 are firmly brazed one end to sleeve 18 and the other end to the edges of the ball surface members 10 and 12. Only minimum finishing is required to provide the ball with the required tolerances ready for use.

It will be seen that this invention provides an extremely inexpensive but strong and accurate ball for ball valves which is a great deal lighter in weight than those of the prior art and which can be made in great quantity rapidly and inexpensively.

In FIG. 6 there is shown in dotted outline the representation of a tube indicated by the reference numeral 46. This tube may be bent inwardly at its ends until it forms a sphere 48 but however having central openings 50. The sleeve 52 just like that at 18 is then inserted extending between these openings and is brazed in place in the same way. The key at 20 may be made as before described.

The bending inwardly of the ends of the cylinder or sleeve 46 from the dotted line position shown in FIG. 6 to the solid line position of the ball 48 may be accomplished by appropriate dies, etc. and is accomplished under appropriate pressure.

Having thus described my invention and the advantages thereof, I do not wish to be limited to the details herein disclosed, otherwise than as set forth in the claims, but what I claim is:

1. A ball for a ball valve, said ball comprising a pair of like hollow hemispherical portions contacting each other at the peripheries thereof, each hemispherical portion having an opening therein, said openings being aligned, a hollow sleeve member connecting the hemispherical portions and extending generally diametrically across the same, the end edge portions of the sleeve being connected to the edge portions of the hemispherical portions about the openings thereof, and means intersecting the surface of the hemispherical portions providing a non-circular key for turning the ball on an axis generally normal to the axis of the sleeve.

2. The ball recited in claim 1 wherein the hemispherical portions are brazed along their contacting edges and to the sleeve at the end edge portions thereof.

3. A ball particularly adapted for use in a ball valve comprising a pair of like hollow hemispherical portions each having a circular edge, said circular edge being of like radius and being adapted to contact each other, each hemispherical portion having an opening therein, said openings being generally the same and having centers along a diametrical axis of the combined hemispherical portions, and a sleeve extending diametrically of the combined hemispherical portions, the end portions of said sleeve being permanently connected to the hemispherical portions at the edges of the openings thereof, whereby said sleeve forms a diametric passage through the ball, the ball being otherwise completely enclosed, and means forming a key for rotating said ball on an axis generally normal to the axis of the sleeve.

4. The ball recited in claim 3 wherein said sleeve is generally cylindrical.

5. A ball particularly adapted for use in a ball valve, said ball comprising a pair of hemispherical hollow members joined together at the edges thereof, said hemispherical members having aligned holes therein at diametrically opposite points on the ball, a sleeve permanently secured at its ends to a respective hemispherical member at the edges of the openings thereof forming a diametrical passage through the ball, a non-circular opening in the surface of the combined hemispherical members, and a non-circular sleeve located in said opening and forming a key for turning the ball.

6. The ball recited in claim 5 wherein the non-circular sleeve is connected at one end to the edge portions of the non-circular opening in the surface of the combined hemispherical members and having the other end thereof connected to the surface of the first-named sleeve.

7. The ball recited in claim 5 wherein the non-circular sleeve is connected at one end to the edge portions of the non-circular opening in the surface of the combined hemispherical members and having the other end thereof connected to the surface of the first-named sleeve midway of the ends of the latter.

References Cited by the Examiner

UNITED STATES PATENTS

| | | | |
|---|---|---|---|
| 1,555,934 | 10/1925 | Barker | 251—367 X |
| 2,947,511 | 8/1960 | McInnes | 251—367 X |
| 3,186,431 | 6/1965 | Moore | 137—561 |

FOREIGN PATENTS 77,790 7/1949 Czechoslavakia.

MARTIN P. SCHWADRON, *Acting Primary Examiner.*

M. CARY NELSON, *Examiner.*

S. SCOTT, *Assistant Examiner.*